United States Patent [19]

Heider et al.

[11] Patent Number: 5,782,524
[45] Date of Patent: Jul. 21, 1998

[54] CURVED WALL TRAILER CONSTRUCTION

[76] Inventors: Merle J. Heider, 203 12th St. SW.;
Dale J. Heider, 1108 8th Ave. SW.;
Leon J. Heider, 1107 Third Ave. SW.;
Craig J. Heider, 812 S. Taft St., all of
Humboldt, Iowa 50548

[21] Appl. No.: 496,896

[22] Filed: Jun. 30, 1995

[51] Int. Cl.⁶ .................................................. B60P 1/56
[52] U.S. Cl. ...................... 296/181; 296/184; 298/27; 298/24; 73/323
[58] Field of Search ......................... 296/181; 298/15, 298/184, 24, 27; 105/247, 254; 73/323

[56] References Cited

U.S. PATENT DOCUMENTS

| Re. 35,580 | 8/1997 | Heider et al. | 298/24 |
|---|---|---|---|
| 1,807,447 | 5/1931 | Smith. | |
| 1,908,684 | 5/1933 | Buchanan. | |
| 2,859,888 | 11/1958 | Fairnington | 298/24 |
| 2,916,916 | 12/1959 | Holsclaw | 73/323 X |
| 3,139,286 | 6/1964 | Johnson | 298/24 X |
| 3,310,345 | 3/1967 | Rowden. | |
| 3,419,310 | 12/1968 | Gramlich. | |
| 3,595,175 | 7/1971 | Austill | 298/27 X |
| 3,692,363 | 9/1972 | Tenbaum et al. | 298/24 |
| 3,883,148 | 5/1975 | Miller. | |
| 4,058,239 | 11/1977 | Van Mill. | |
| 4,070,059 | 1/1978 | Ksenych. | |
| 4,227,732 | 10/1980 | Kish. | |
| 4,258,953 | 3/1981 | Johnson. | |
| 4,348,047 | 9/1982 | Harshman. | |
| 4,614,477 | 9/1986 | Hagenbuch | 73/323 X |
| 5,326,156 | 7/1994 | Heider et al. | 298/24 |
| 5,338,079 | 8/1994 | Kuhns | 296/15 |

Primary Examiner—Joseph D. Pape
Attorney, Agent, or Firm—Zarley, McKee, Thomte, Voorhees, & Sease

[57] ABSTRACT

A trailer construction includes first and second spaced apart trailer side walls. A bottom wall is provided between the side walls and includes a forward sloping portion, a rear sloping portion and an intermediate portion therebetween. The forward and rear sloping portions of the bottom wall are curved in cross section, and the intermediate portion includes a continuous wall which is curved when viewed in a horizontal cross section and is also curved when viewed in a vertical cross section. A discharge opening is provided in the intermediate portion of the bottom wall.

12 Claims, 4 Drawing Sheets

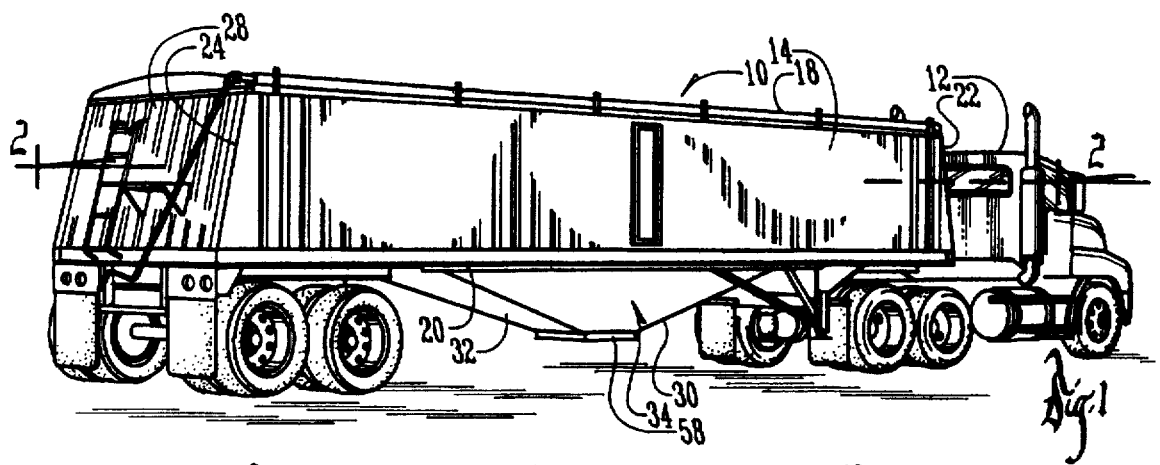
Fig. 1
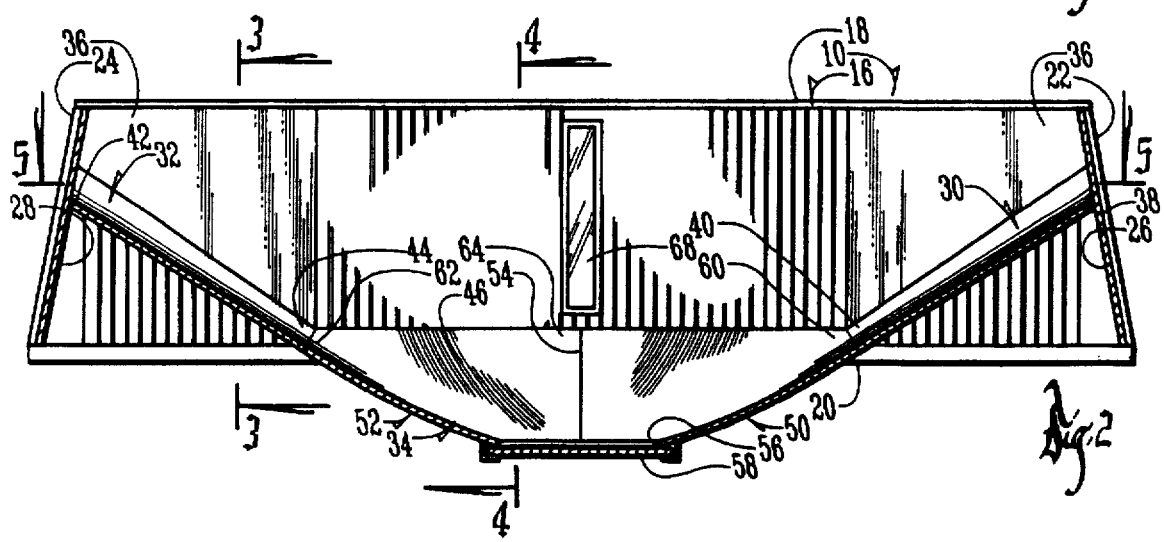
Fig. 2
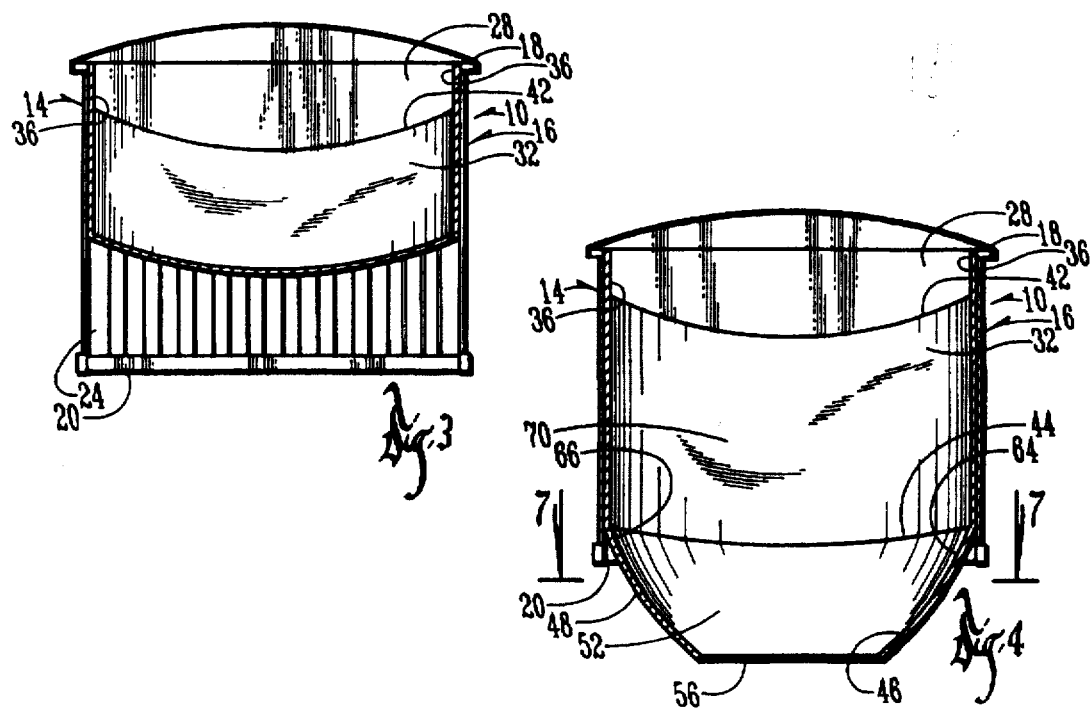
Fig. 3
Fig. 4

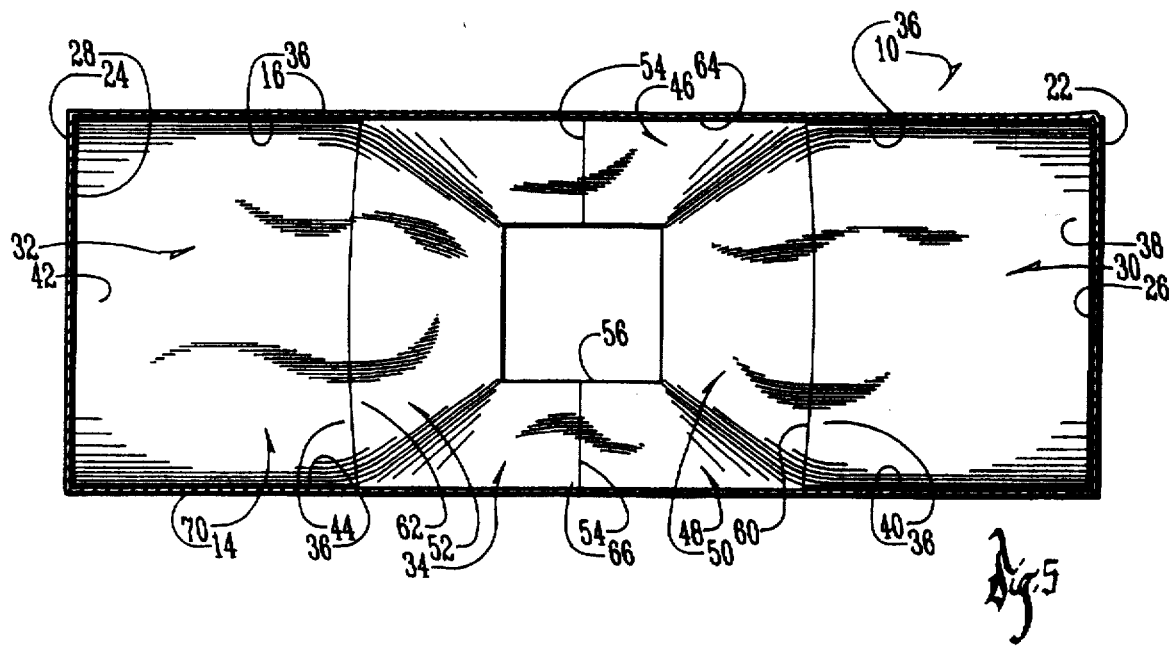
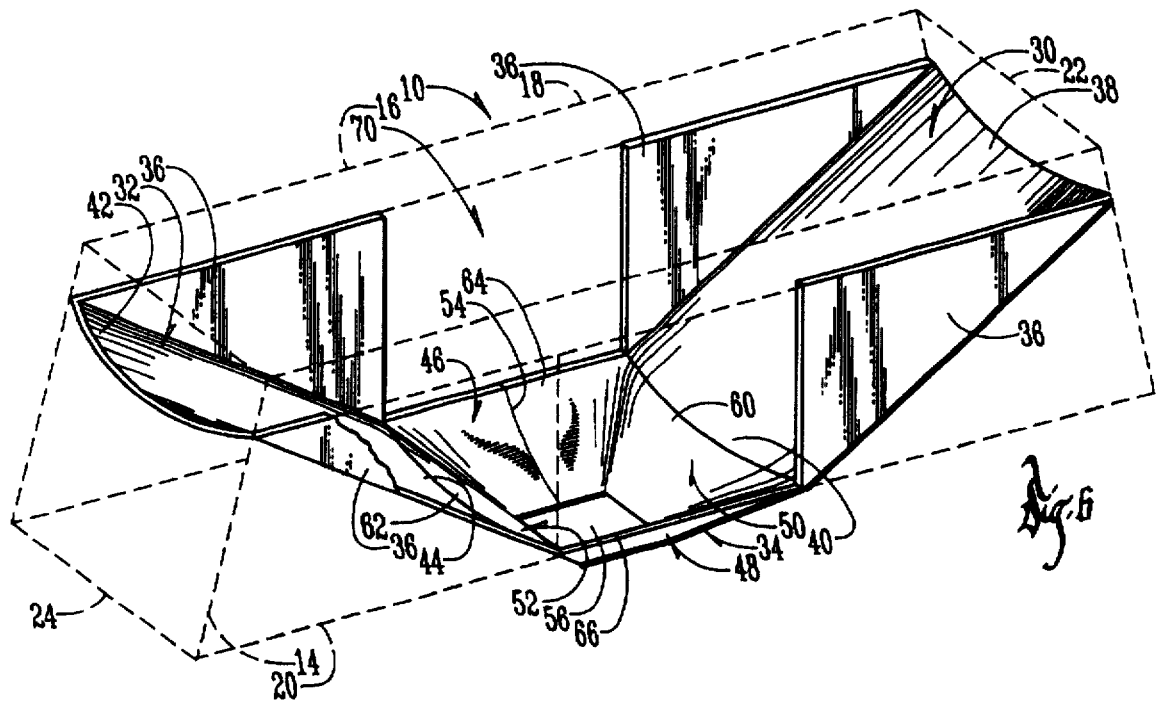

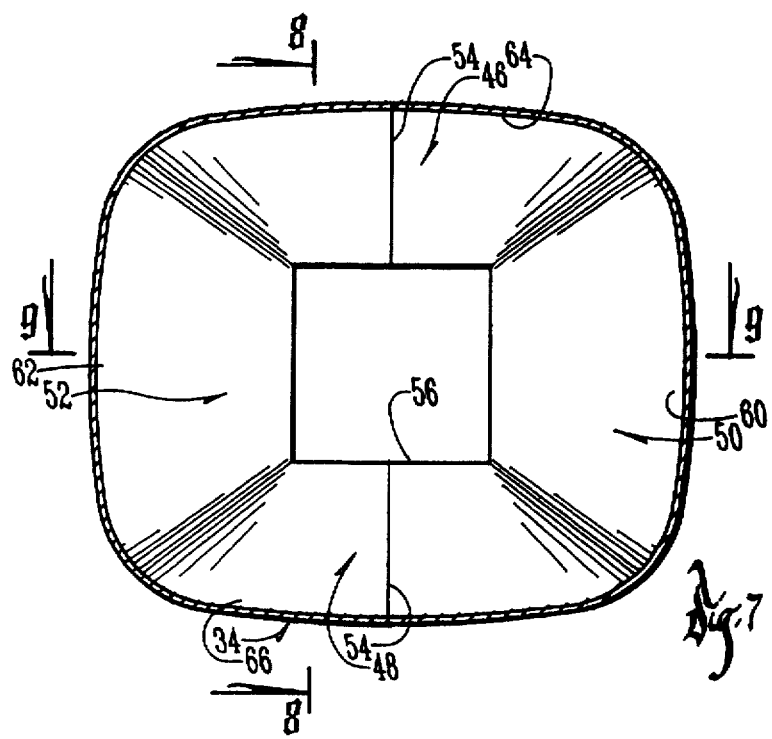
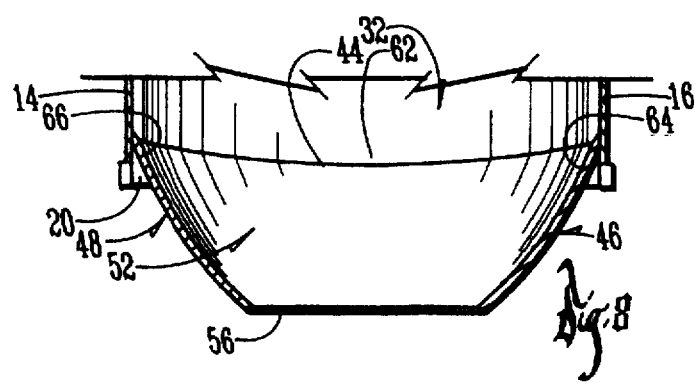
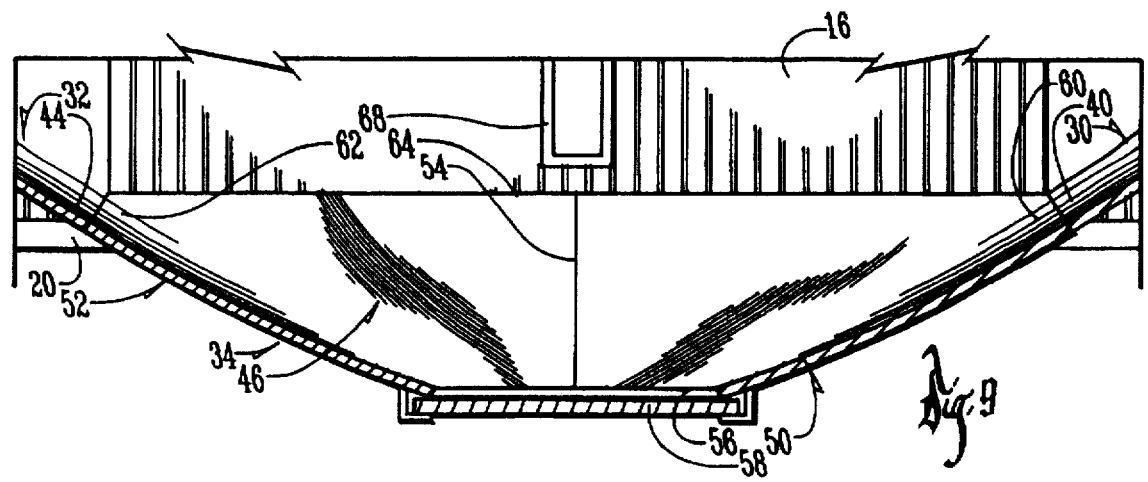

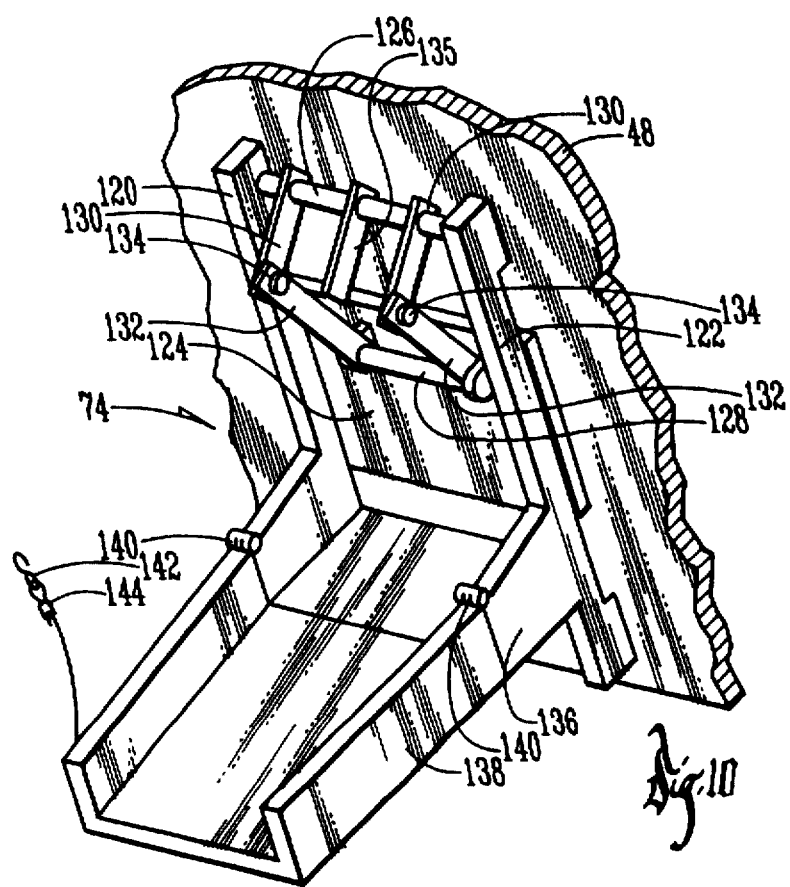

5,782,524

1

CURVED WALL TRAILER CONSTRUCTION

BACKGROUND OF THE INVENTION

The present invention relates to a curved wall trailer construction.

Trailers used for handling grain or other bulk materials generally include a pair of spaced apart vertical side walls and a bottom wall having inclined front and rear portions. In the center of the bottom wall is usually mounted a hopper having a discharge opening at its lower end. The sloped front and rear walls in conventional trailer construction are flat or straight in cross section. Similarly the hopper at the lower end of the front and rear sloped walls usually includes four trapezoidal flat walls which are joined at their corners to form a corner seam. Each of the four trapezoidal walls is straight in cross section.

One disadvantage of the flat wall construction in these prior art trailers is that the weight of the bulk material within the trailers often causes the bottom walls and the hopper walls to curve or bulge. To prevent this curving or bulging reinforcing beams are usually provided on the outer surface thereof.

Therefore a primary object of the present invention is the provision of an improved trailer construction which utilizes curved walls.

A further object of the present invention is the provision of a trailer construction which includes hopper walls and sloping front and rear walls which are curved to a shape which generally conforms to the shape they would assume if distorted by a very large load in the trailer.

A further object of the present invention is the provision of an improved trailer construction which minimizes the parts necessary and the weld processes which are necessary in construction.

A further object of the present invention is the provision of an improved trailer construction which reduces the weight of the sloping front and rear walls and the hopper in the trailer by eliminating the need for reinforcing beams.

A further object of the present invention is the provision of an improved trailer construction which provides smooth curved surfaces for preventing the hang up of fine or wet materials during discharge of the cargo as commonly occurs in the corner areas of present trailer constructions.

A further object of the present invention is the provision of an improved trailer construction which is economical to manufacture, durable in use and efficient in operation.

SUMMARY OF THE INVENTION

The foregoing objects may be achieved by trailer construction comprising first and second spaced apart trailer side walls each having a forward end, a rear end, an upper edge, and a lower edge. An elongated bottom wall is provided between the spaced apart side walls and includes a forward end, a rear end, a front sloping portion, a rear sloping portion, and a intermediate portion. The front and rear sloping portions extend from the forward and rear ends respectively of the bottom wall in a downwardly inclined direction toward the intermediate portion. The front and rear sloping portions of the bottom wall are curved when viewed in cross section taken along a plane perpendicular to the longitudinal axis of the trailer.

The intermediate portion of the trailer comprises a hopper having an open upper end connected to the front and rear sloping portions of the bottom wall and being shaped to taper downwardly and inwardly to form a reduced cross

2 section lower end. The hopper includes a discharge opening therein and a door fitted in covering relation over the discharge opening.

A further aspect of the present invention is the provision of a curved wall construction for the hopper. The side walls of the hopper when viewed in a cross section taken on a horizontal plane are continuous and curved.

Another feature of the present invention is the provision of a vertical window in the side wall of the trailer for viewing the interior of the trailer to determine the level of contents within the trailer.

BRIEF DESCRIPTION OF THE FIGURES OF THE DRAWINGS

FIG. 1 is a perspective view of a truck trailer combination utilizing a trailer of the present construction.

FIG. 2 is a sectional view taken along line 2—2 of FIG. 1.

FIG. 3 is a sectional view taken along line 3—3 of FIG. 2.

FIG. 4 is a sectional view taken along line 4—4 of FIG. 2.

FIG. 5 is a sectional view taken along line 5—5 of FIG. 2.

FIG. 6 is a perspective view of the sloping front and rear walls and the hopper, showing the side walls and ends walls of the trailer construction in shadow lines.

FIG. 7 is a sectional view taken along line 7—7 of FIG. 4.

FIG. 8 is a sectional view taken along line 8—8 of FIG. 7.

FIG. 9 is a sectional view taken along line 9—9 of FIG. 7.

FIG. 10 is a perspective detailed view of a side discharge opening for the hopper.

DETAILED DESCRIPTION OF THE PREFERRED EMBODIMENT

Referring to FIG. 1, the numeral 10 generally designates the trailer construction of the present invention. Trailer 10 is shown being pulled by an over-the-road tractor 12. Trailer 10 is comprised of two spaced apart vertical trapezoidal side walls 14, 16, each of which includes a top edge 18, a bottom edge 20, a front edge 22 and a rear edge 24. Joining the front edges of side walls 16, 18 is a front wall 26 and joining the rear edges of side walls 14, 16 is a rear wall 28. A bottom wall for the trailer is provided by a front sloping wall 30, a rear sloping wall 32, and an intermediate hopper 34 which is positioned therebetween. Each of the front and rear sloping walls 30, 32 includes vertical side flaps 36 which extend along and are attached to the opposite side walls 14, 16 of the trailer 10. The side flaps may be attached by bolts, rivets, or welding as desired. Wall 30 includes an upper end 38 which is welded or otherwise attached to end wall 22, and a lower end 40. Rear sloping wall 32 includes an upper end 42 secured to rear wall 28 and includes a lower end 44. In cross section both the front sloping wall 30 and the rear sloping wall 32 are curved or arcuate in shape as is illustrated in FIG. 3 which shows the curvature of sloping wall 32.

The intermediate hopper 34 includes an inwardly tapered circumferential wall which is formed by lateral hopper wall portions 46, 48 (FIG. 7) and front and rear hopper wall portions 50, 52. The wall portions 46, 48, 50, 52 are curved in shape, and the junctures between those wall portions are curved and continuous so as to eliminate any corners or seams. The hopper may be formed by a forming dye so that there are no seams whatsoever, or it may be formed by two plates joined together at seam 54 to create the curved truncated shape similar to that of a funnel.

At the bottom of hopper 34 is a discharge opening 56 having a discharge door 58 slidably fitted thereover. The upper edges of the hopper are designated by the numerals 60, 62, 64 and 66. The edges 60, 62 are welded to the lower edges 40, 44 respectively of sloping walls 30, 32 and the edges 64, 66 are welded to the side walls 14, 16 so as to create a material carrying compartment 70. A window 68, is provided in both of the side walls 14, 16 and extends vertically therein so as to permit the viewing of the contents within the material compartment 70 from outside the trailer.

As can be seen in FIGS. 8 and 9 all of the side wall portions 46, 48, 50, 52 of the hopper 34 are curved in shape when a vertical cross section is taken with respect to the longitudinal axis of the vehicle and when a vertical section is taken through a plane which extends along the longitudinal axis of the vehicle. Similarly, when a section is taken along a horizontal plane through the hopper 34, the walls of the hopper assume a oval curved shape as can be seen in FIG. 7.

Referring to FIG. 10, a modified form of discharge chute is designated by the numeral 74. The side discharge chute 74 may be mounted on either the side wall portion 48 of hopper 34 as shown in FIG. 10 or it may also be mounted upon the opposite side wall portion 46, or upon both side walls 46, 48. Chute 74 includes a pair of spaced apart parallel support brackets 120, 122 which are welded or otherwise secured to the angled side wall portions 46, 48. Slidably mounted between support brackets 120, 122 and wall portion 48 is a sliding door 124 which can slide vertically from its closed position shown in FIG. 10 to an open position wherein it exposes a discharge opening (not shown) in side wall portion 48. Sliding door 124 is moved by a toggle system comprising an upper rotatable shaft 126, a lower rotatable shaft 128, a pair of upper toggle links 130, and a pair of lower toggle links 132. Toggle links 130, 132 are pivotally joined by pivotal link connection 134. A lever handle 135 is fixedly attached to upper rotatable shaft 126 for rotating the shaft 126 to cause the toggle links 130, 132 to pull the sliding door 124 from its closed position shown in FIG. 10 to an elevated open position.

Attached to support brackets 120, 122 is fixed chute section 136. A pivoting chute section 138 is pivotally attached to fixed chute section 136 by means of a pivot pin 140. A cable 142 having a hook 144 on the end thereof may be hooked over the upper shaft 126 to cause the folding chute section 138 to be held in an elevated position during non use.

Side chutes such as chute 74 permit the trailer 10 to be used to fill a typical auger conveyor used on farms. The trailer is pulled along side the auger conveyor and the side chutes can be used to empty the contents of the trailer into the auger or conveyor.

The use of the curved sloped walls 30, 32 and the curved walled hopper 34 eliminates the need for beams or other braces on the outsides of those respective walls. Furthermore, the curvature of these walls eliminates the corners and niches where grain or other granulated material might accumulate. Instead a smooth continuous surface is provided along the bottom wall of the trailer to the discharge opening much in the nature of a funnel.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A trailer construction comprising:
   first and second spaced apart trailer side walls, each having a forward end, a rear end, an upper edge, and a lower edge;
   an elongated bottom wall having a longitudinal axis, a forward end, a rear end, a front sloping portion, a rear sloping portion, and an intermediate portion, said front and rear sloping portions extending from said forward and rear ends respectively of said bottom wall in a downwardly inclined direction towards said intermediate portion;
   said front and rear sloping portions being curved when viewed in cross section taken along a plane perpendicular to said longitudinal axis;
   said intermediate portion comprising a hopper having an open upper end connected to said front and rear sloping portions of said bottom wall and being shaped to taper downwardly and inwardly to form a reduced cross section lower end, said hopper having a discharge opening therein; and
   a door fitted in covering relation over said discharge opening.

2. A trailer construction according to claim 1 wherein said hopper includes a hopper side wall extending therearound, said hopper side wall being continuous and curved when viewed in cross section taken on a horizontal plane.

3. A trailer construction according to claim 1 wherein at least one of said trailer side walls includes a viewing window having an upper end and a lower end adjacent said upper edges and said lower edges respectively of said one side wall.

4. A trailer construction according to claim 1 wherein said discharge opening is at said lower end of said hopper and lies in a horizontal plane.

5. A trailer construction according to claim 1 wherein said hopper includes a hopper side wall and said discharge opening is in said hopper side wall.

6. A trailer construction according to claim 2 wherein said hopper side wall is curved when viewed in cross section taken in a vertical plane.

7. A trailer construction according to claim 1 wherein said open upper end of said hopper is connected to said trailer side walls.

8. A trailer construction according to claim 1 wherein said bottom wall is positioned completely between said side walls.

9. A trailer construction comprising:
   first and second spaced apart trailer side walls, each having a forward end, a rear end, an upper edge, and a lower edge;

an elongated bottom wall located completely between said side walls and having a longitudinal axis, a forward end, a rear end, a front sloping portion, a rear sloping portion, and an intermediate portion, said front and rear sloping portions extending from said forward and rear ends respectively of said bottom wall in a downwardly inclined direction towards said intermediate portion;

at least a portion of said bottom wall being curved in cross-section-taken along a plane perpendicular to said longitudinal axis.

10. A trailer construction according to claim 9 wherein at least one of said side walls includes a window having a transparent sheet material therein for viewing the interior of said trailer.

11. A trailer construction comprising:

first and second spaced apart trailer side walls, each having a forward end, a rear end, an upper edge, and a lower edge;

an elongated bottom wall having a longitudinal axis, a forward end, a rear end, a front sloping portion, a rear sloping portion, and an intermediate portion, said front and rear sloping portions extending from said forward and rear ends respectively of said bottom wall in a downwardly inclined direction toward said intermediate portion;

said intermediate portion comprising a hopper having an open upper end connected between said front and rear sloping portions of said bottom wall and having a hopper side wall tapering downwardly and inwardly to form a reduced cross section lower end; said hopper side wall being continuous and curved when viewed in cross section taken on a horizontal plane;

said hopper having a discharge opening therein; and a door fitted in covering relation over said discharge opening.

12. A trailer construction according to claim 11 wherein said bottom wall is positioned completely between said side walls.

* * * * *